US009947923B2

(12) United States Patent
Kuriyama et al.

(10) Patent No.: US 9,947,923 B2
(45) Date of Patent: Apr. 17, 2018

(54) NONAQUEOUS ELECTROLYTE BATTERY AND BATTERY PACK

(71) Applicant: KABUSHIKI KAISHA TOSHIBA, Minato-ku (JP)

(72) Inventors: Hiromichi Kuriyama, Yokkaichi (JP); Hikaru Yoshikawa, Kashiwazaki (JP); Hidesato Saruwatari, Kawasaki (JP); Yasuaki Murashi, Kashiwazaki (JP); Dai Yamamoto, Kashiwazaki (JP); Naoki Nishio, Kashiwazaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 128 days.

(21) Appl. No.: 15/051,035

(22) Filed: Feb. 23, 2016

(65) Prior Publication Data

US 2016/0240849 A1    Aug. 18, 2016

Related U.S. Application Data

(63) Continuation of application No. PCT/JP2015/054142, filed on Feb. 16, 2015.

(51) Int. Cl.
*H01M 4/50* (2010.01)
*H01M 4/00* (2006.01)
(Continued)

(52) U.S. Cl.
CPC ......... *H01M 4/505* (2013.01); *H01M 2/0285* (2013.01); *H01M 2/0287* (2013.01);
(Continued)

(58) Field of Classification Search
CPC ......... H01M 4/50; H01M 4/364; H01M 4/525
See application file for complete search history.

(56) References Cited

U.S. PATENT DOCUMENTS

2006/0046155 A1*  3/2006  Inagaki ............... H01M 4/131
                                                    429/332
2006/0063070 A1*  3/2006  Chiga .................... C01G 51/42
                                                    429/231.1
(Continued)

FOREIGN PATENT DOCUMENTS

JP    2001-143705    5/2001
JP    2001-210324    8/2001
(Continued)

OTHER PUBLICATIONS

Office Action dated May 30, 2017 in Japanese Patent Application No. 2016-503245.
(Continued)

*Primary Examiner* — Matthew J Merkling
(74) *Attorney, Agent, or Firm* — Oblon, McClelland, Maier & Neustadt, L.L.P.

(57) ABSTRACT

The nonaqueous electrolyte battery according to one embodiment includes a positive electrode and a negative electrode. The positive electrode contains a positive electrode active material containing manganese-containing composite oxide. The negative electrode contains a negative electrode active material selected from the group consisting of titanium oxide and titanium-containing composite oxide. A ratio p/n of a capacity p per unit area of the positive electrode to a capacity n per unit area of the negative electrode is in the range of 0.8 or more and 1 or less.

16 Claims, 4 Drawing Sheets

(51) Int. Cl.
  *H01M 4/505* (2010.01)
  *H01M 2/02* (2006.01)
  *H01M 4/131* (2010.01)
  *H01M 4/36* (2006.01)
  *H01M 4/485* (2010.01)
  *H01M 10/0525* (2010.01)
  *H01M 4/525* (2010.01)
  *H01M 4/58* (2010.01)

(52) U.S. Cl.
  CPC ........... *H01M 4/131* (2013.01); *H01M 4/364* (2013.01); *H01M 4/485* (2013.01); *H01M 10/0525* (2013.01); *H01M 4/525* (2013.01); *H01M 4/5825* (2013.01); *Y02T 10/7011* (2013.01)

(56) References Cited

U.S. PATENT DOCUMENTS

| | | | |
|---|---|---|---|
| 2006/0216600 A1* | 9/2006 | Inagaki | H01M 2/06 429/231.1 |
| 2007/0015055 A1 | 1/2007 | Lee et al. | |
| 2007/0281214 A1* | 12/2007 | Saruwatari | H01M 4/131 429/231.95 |
| 2008/0213665 A1* | 9/2008 | Nishida | H01M 4/485 429/223 |
| 2011/0171529 A1* | 7/2011 | Kono | H01M 4/0471 429/223 |
| 2013/0330613 A1* | 12/2013 | Saruwatari | H01M 4/131 429/211 |
| 2014/0178749 A1* | 6/2014 | An | H01M 4/364 429/188 |

FOREIGN PATENT DOCUMENTS

| | | |
|---|---|---|
| JP | 2007-87909 | 4/2007 |
| JP | 2007-273154 | 10/2007 |
| JP | 2009-277395 | 11/2009 |
| JP | 2010-9898 | 1/2010 |
| JP | 2011-81931 | 4/2011 |
| JP | 2012-216549 | 11/2012 |
| JP | 2013-186972 | 9/2013 |
| JP | 2013-243090 | 12/2013 |
| JP | 2015-15087 | 1/2015 |

OTHER PUBLICATIONS

International Search Report dated Mar. 31, 2015 in PCT/JP2015/054142 (English Translation only).
International Search Report dated Mar. 31, 2015 in PCT/JP2015/054142 filed Feb. 16, 2015 (with English Translation of Categories of Cited Documents).
Written Opinion dated Mar. 31, 2015 in PCT/JP2015/054142 filed Feb. 16, 2015.
Motoshi Kiribayashi, et al., "Application of Lead-Acid Batteries for Idling-Stop Vehicles" (with English Abstract), GS Yuasa Corporation Technical Report, 2004, 6 pgs.

* cited by examiner

NONAQUEOUS ELECTROLYTE BATTERY AND BATTERY PACK

CROSS-REFERENCE TO RELATED APPLICATIONS

This application is a Continuation Application of PCT Application No. PCT/JP2015/054142, filed Feb. 16, 2015, the entire contents of which are incorporated herein by reference.

FIELD

Embodiments described herein relate to a nonaqueous electrolyte battery and a battery pack.

BACKGROUND

Systems realizing input-and-output characteristics higher than those of conventional lead storage battery systems are under development by building a storage battery system in which a 12-V lead storage battery and a lithium ion secondary battery are connected in parallel. By installing such a storage battery system in, for example, a vehicle, power generation using regenerative energy and a large-current discharge necessary for restarting an engine after an idling stop can be expected.

DETAILED DESCRIPTION

Figure 1:
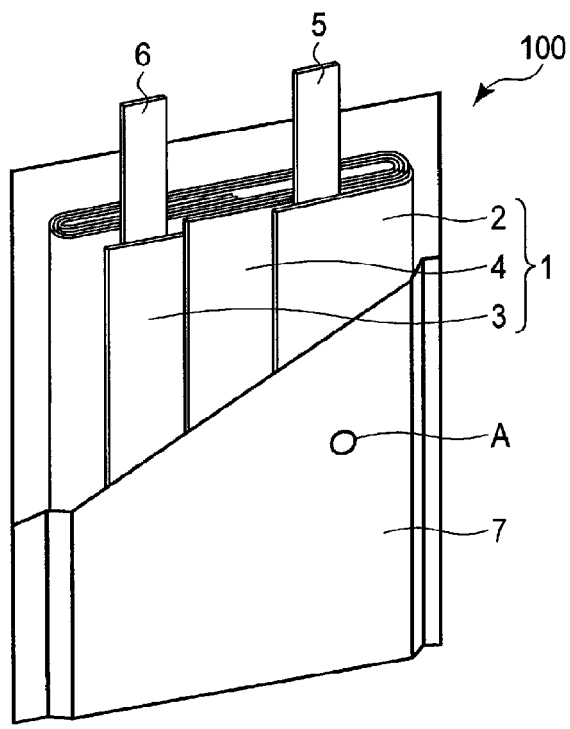
FIG. 1 is a partially cut-out perspective view of an example of a nonaqueous electrolyte battery according to the first embodiment.

In general, according to an embodiment, a nonaqueous electrolyte battery is provided. The nonaqueous electrolyte battery includes a positive electrode, a negative electrode, and a nonaqueous electrolyte. The positive electrode contains a positive electrode active material containing a manganese-containing composite oxide. The manganese-containing composite oxide has a spinel-type crystal structure and is represented by a general formula of $Li_{1-a}Mn_{2-x}M_xO_4$. In the general formula, M is at least one element selected from the group consisting of Mg, Ti, Cr, Fe, Co, Zn, Al, and Ga. A subscript a is within a range of −1 or more and 1 or less. A subscript x is in the range of 0.22 or more and 0.7 or less. The negative electrode contains a negative electrode active material selected from the group consisting of titanium oxide and titanium-containing composite oxide. A ratio p/n of a capacity p per unit area of the positive electrode to a capacity n per unit area of the negative electrode is in the range of 0.8 or more and 1 or less.

Hereinafter, the embodiments will be described with reference to the drawings. The same reference signs are attached to components common throughout the embodiments and a duplicate description is thereby omitted. Each drawing is a schematic view to provide a description of the embodiments and to facilitate an understanding thereof and shapes, dimensions, or ratios thereof may be different from those of an actual apparatus. However, they can be appropriately designed and modified by taking into consideration the following description and known techniques.

First Embodiment

According to a first embodiment, a nonaqueous electrolyte battery is provided. The nonaqueous electrolyte battery includes a positive electrode, a negative electrode, and a nonaqueous electrolyte. The positive electrode contains a positive electrode active material containing a manganese-containing composite oxide. The manganese-containing composite oxide has a spinel-type crystal structure and is represented by a general formula of $Li_{1-a}Mn_{2-x}M_xO_4$. In the general formula, M is at least one element selected from the group consisting of Mg, Ti, Cr, Fe, Co, Zn, Al, and Ga. A subscript a is within a range of −1 or more and 1 or less. A subscript x is in the range of 0.22 or more and 0.7 or less. The negative electrode contains a negative electrode active material selected from the group consisting of titanium oxide and titanium-containing composite oxide. A ratio p/n of a capacity p per unit area of the positive electrode to a capacity n per unit area of the negative electrode is in the range of 0.8 or more and 1 or less.

In a vehicle adopting an idling stop system, particularly an electric vehicle or a hybrid electric vehicle, it is required to discharge a large current from a battery system when the engine of the vehicle is restarted. Thus, such a battery system is required to have excellent large-current characteristics. It is known, however, that the life of a lead storage battery becomes extremely shorter if the lead storage is used in such a battery system. The main cause is considered to be the formation of coarse particles of lead sulfate on the surface of an electrode of the lead storage battery when a large voltage-drop occurs during a discharge. To inhibit the degradation, it is necessary to reduce a discharge load of the lead storage battery to maintain the lead storage battery in a high voltage range. The desirable voltage range to inhibit the degradation is considered to be 12.5 V to 14.0 V.

To reduce the discharge load of the lead storage battery, storage battery systems in which a lithium ion secondary battery is connected in parallel with the lead storage battery are under development. Particularly, a battery module constituted by connecting to each other in series five lithium ion secondary batteries using titanium oxide or titanium composite oxide for the negative electrode and lithium manganate ($Li_{1-a}Mn_2O_4$) having a spinel-type crystal structure for the positive electrode can generate the average operating voltage of 12 V or more and so can be connected in parallel with the lead storage battery.

Further, to realize the average operating voltage in the range of 12.5 V or more that is effective for degradation inhibition of the lead storage battery, some contrivance to increase the average operating voltage is needed. A method of setting the ratio of the positive electrode capacity and the negative electrode capacity to 1.0 or less can be considered as a method of increasing the average operating voltage. In a lithium ion secondary battery for which the ratio is 1.0 or less, the positive electrode can be charged up to a high potential. In such a lithium ion secondary battery, however, Mn elution from lithium manganate $Li_{1-a}Mn_2O_4$ used for the positive electrode into the electrolytic solution is conspicuous and, as a result, the capacity decrease and resistance increase are more likely to occur. The Mn elution increases with a rising temperature and thus, it is difficult to install such a lithium ion secondary battery in a compartment (for example, an engine room) where the temperature rises of a vehicle. Also in such a lithium ion secondary battery, the capacity of the positive electrode is likely to decrease one-sidedly and thus, an open circuit voltage (OCV) in each state-of-charge of the battery may rise. As a result, when output characteristics from some voltage are assumed, compared with an initial battery, that is, a battery immediately after shipment, a degraded battery outputs in a lower state-of-charge and thus, degradation in output characteristics arises.

As a result of in-depth study, the inventors realize a nonaqueous electrolyte battery capable of solving the above problems.

The positive electrode included in a nonaqueous electrolyte battery according to the first embodiment contains a positive electrode active material containing a manganese-containing composite oxide which has a spinel-type crystal structure and is represented by the general formula of $Li_{1-a}Mn_{2-x}M_xO_4$. M is at least one element selected from the group consisting of Mg, Ti, Cr, Fe, Co, Zn, Al, and Ga. The subscript a is within the range of −1 or more and 1 or less. The subscript x is within the range of 0.22 or more and 0.7 or less. The subscript a is the index of a state-of-charge of the manganese-containing composite oxide and a larger value a means a state closer to a fully charged state. The subscript x shows the amount of the element M substituted for manganese Mn in manganese-containing composite oxide represented by the general formula of $Li_{1-a}Mn_{2-x}M_xO_4$.

Lithium manganate $Li_{1-a}Mn_2O_4$ in which the element M is not substituted for manganese Mn is in a two-phase coexisting state of a $Li_{0.5}Mn_2O_4$ phase and a λ-$MnO_2$ phase in a state-of-charge in which the subscript a is 0.5 or more. Such a two-phase coexisting state can be ended by substituting the element M for a portion of manganese Mn of lithium manganate and as a result, the crystal structure of manganese-containing composite oxide can be stabilized. Manganese-containing composite oxide with a stable crystal structure can inhibit Mn elution even in a state-of-charge in which the subscript a is 0.5 or more. Therefore, such manganese-containing composite oxide can exhibit excellent high-temperature durability.

If the substitution amount x is smaller than 0.22, a two-phase coexisting state remains in manganese-containing composite oxide and thus, a degradation-inhibition effect by structure stabilization is not obtained sufficiently. On the other hand, if the substitution amount x is larger than 0.7, the spinel-type crystal structure cannot be maintained and the structure is rather destabilized. The substitution amount x is preferably within the range of 0.3 or more and 0.55 or less. Furthermore, the element M contained in manganese-containing composite oxide represented by the general formula $Li_{1-a}Mn_{2-x}M_xO_4$ is preferably Al.

A nonaqueous electrolyte battery according to the first embodiment in which the ratio p/n of the capacity p per unit area of the positive electrode containing such manganese-containing composite oxide to the capacity n per unit area of the negative electrode containing a negative electrode active material selected from the group consisting of titanium oxide and titanium-containing composite oxide is set to 0.8 or more and 1 or less can be charged until the positive electrode reaches a higher potential so that the average operating voltage of the battery can be increased. Thus, a nonaqueous electrolyte battery according to the first embodiment can inhibit the elution of Mn and as a result, can exhibit a high average-operating-voltage while exhibiting excellent high-temperature durability.

Even if the ratio p/n is made less than 0.8, an effect of further increasing the average operating voltage is hardly obtainable. On the other hand, if the ratio p/n is made greater than 1, the average operating voltage decreases. The method of adjusting the ratio p/n will be described later. The ratio p/n is preferably within the range of 0.9 or more and 1.0 or less.

In addition to the positive electrode active material containing the manganese-containing composite oxide, the positive electrode can also contain a second positive electrode active material. The second positive electrode active material preferably has a capacity per weight of 10 mAh/g or more and 150 mAh/g or less in a potential range of 3 V (vs. Li/Li$^+$) or more and 3.9 V (vs. Li/Li$^+$) or less with respect to the oxidation-reduction potential of the metal Li. Such second positive electrode active materials include, for example, lithium-nickel composite oxide (for example, $LiNiO_2$), lithium-cobalt composite oxide ($LiCoO_2$), lithium-nickel-cobalt composite oxide (for example, $LiNi_{1-x}Co_xO_2$, 0<x<1), lithium-nickel-cobalt-manganese composite oxide (for example, $LiNi_{1-x-y}Co_xMn_yO_2$, 0<x<1, 0<y<1, 0<x+y<1), lithium-manganese-cobalt composite oxide (for example, $LiMn_xCo_{1-x}O_2$, 0<x<1), and lithium iron phosphate ($LiFePO_4$). The positive electrode may contain one or more of these second positive electrode active materials.

When the content of the manganese-containing composite oxide in the positive electrode is 1 part by weight, such a second positive electrode active material is preferably contained in the content of 0.01 part by weight or more and 0.05 part by weight or less. Each content refers to the weight of each of the manganese-containing composite oxide and the second positive electrode active material contained per unit area of the positive electrode. When the content of the manganese-containing composite oxide in the positive electrode is 1 part by weight, the content of the second positive electrode active material is particularly preferably within the range of 0.02 part by weight or more and 0.05 part by weight or less.

With such a second positive electrode active material contained in the positive electrode in the above content, the degradation of the manganese-containing composite oxide $Li_{1-a}Mn_{2-x}M_xO_4$ can further be inhibited. The reason therefor will be described below.

When the potential of the manganese-containing composite oxide $Li_{1-a}Mn_{2-x}M_xO_4$ becomes 3 V (vs. Li/Li$^+$) or less, the manganese-containing composite oxide may change to a state $Li_{1+b}Mn_{2-x}M_xO_4$ (a subscript b is in the range of 0 or more and 1.0 or less) in which Li is contained still more. In the manganese-containing composite oxide $Li_{1+b}Mn_{2-x}M_xO_4$ in which Li is excessive, the crystal structure is likely to change from $Li_{1-a}Mn_{2-x}M_xO_4$ of a cubic crystal to a tetragon and the structure may be destabilized. By allowing the positive electrode containing the manganese-containing composite oxide $Li_{1-a}Mn_{2-x}M_xO_4$ to contain the second positive electrode active material whose capacity per weight in the potential range of 3 V (vs. Li/Li$^+$) or more and 3.9 V (vs. Li/Li$^+$) or less is 10 mAh/g or more and 150 mAh/g or less, the potential of the positive electrode can be prevented from falling to 3 V (vs. Li/Li$^+$) and the crystal structure of cubic crystal of the manganese-containing composite oxide $Li_{1-a}Mn_{2-x}M_xO_4$ can be maintained in a stable manner. Particularly, by containing the second positive electrode active material in the content of 0.01 part by weight or more and 0.05 part by weight in the positive electrode when the content of the manganese-containing composite oxide is 1 part by weight, a sufficiently high average-operating-voltage can be obtained and at the same time, the potential of the manganese-containing composite oxide can sufficiently be prevented from falling to 3 V or less.

Next, a nonaqueous electrolyte battery according to the first embodiment will be described in more detail.

The nonaqueous electrolyte battery according to the first embodiment includes a positive electrode, a negative electrode, and a nonaqueous electrolyte. The negative electrode may contain a negative electrode current collector and a negative electrode mixture layer formed on the negative electrode current collector.

The negative electrode current collector may contain a portion supporting no negative electrode mixture layer on the surface thereof. The portion can act as a negative electrode tab. Alternatively, the negative electrode may further include the negative electrode tab separately from the negative electrode current collector.

The negative electrode active material may be contained in the negative electrode mixture layer. The negative electrode mixture layer may further contain a conductive agent or a binder if necessary.

The positive electrode may contain a positive electrode current collector and a positive electrode mixture layer formed on the positive electrode current collector. The positive electrode current collector may contain a portion supporting no positive electrode mixture layer on the surface thereof. The portion can act as a positive electrode tab. Alternatively, the positive electrode may further include the positive electrode tab separately from the positive electrode current collector.

The positive electrode active material containing a manganese-containing composite oxide $Li_{1-a}Mn_{2-x}M_xO_4$ having a spinel-type crystal structure may be contained in the positive electrode mixture layer. The positive electrode mixture layer can contain one or more of manganese-containing composite oxides $Li_{1-a}Mn_{2-x}M_xO_4$ having a spinel-type crystal structure. The positive electrode mixture layer may further contain a second positive electrode active material, a conductive agent, or a binder if necessary.

The positive electrode and the negative electrode can constitute an electrode group. In the electrode group, the positive electrode mixture layer and the negative electrode mixture layer may be opposed to each other via, for example, a separator. The electrode group may have various structures. For example, the electrode group may have a stack type structure. An electrode group in the stack type structure can be obtained by laminating a plurality of positive electrodes and a plurality of negative electrodes with the separators each of which is sandwiched between the positive electrode mixture layer and the negative electrode mixture layer. Alternatively, the electrode group may have a coiled type structure. An electrode group in the coiled type structure can be obtained by laminating, for example, one separator, one positive electrode, another separator, and one negative electrode in this order to produce a laminate, and then coiling the laminate such that the negative electrode is on the outer side.

The nonaqueous electrolyte battery can further contain a negative electrode terminal and a positive electrode terminal. The negative electrode terminal can act as a conductor allowing electrons to move between the negative electrode and an external circuit by a portion thereof being electrically connected to a portion of the negative electrode. The negative electrode terminal can be connected to, for example, the negative electrode current collector, particularly the negative electrode tab. Similarly, the positive electrode terminal can act as a conductor allowing electrons to move between the positive electrode and an external circuit by a portion thereof being electrically connected to a portion of the positive electrode. The positive electrode terminal can be connected to, for example, the positive electrode current collector, particularly the positive electrode tab.

The nonaqueous electrolyte battery according to the first embodiment can further include a container member. The container member can house the electrode group and a nonaqueous electrolyte. The electrode group may be impregnated with the nonaqueous electrolyte in the container member. A portion of each of the positive electrode terminal and the negative electrode terminal can be projected from the container member.

Hereinafter, the negative electrode, the positive electrode, the nonaqueous electrolyte, the separator, the positive electrode terminal, the negative electrode terminal, and the container member will be described in more detail.

(1) Negative Electrode

As the negative electrode current collector, a sheet containing a material of high electric conductivity can be used. For example, aluminum foil or aluminum alloy foil can be used as the negative electrode current collector. When aluminum foil or aluminum alloy foil is used, the thickness thereof is, for example, 20 µm or less and preferably 15 µm or less. The aluminum alloy foil may contain magnesium, zinc, silicon or the like. In addition, the content of transition metal such as iron, copper, nickel, and chromium contained in the aluminum alloy foil is preferably 1% or less.

The negative electrode active material contained in the negative electrode is preferably selected from the group consisting of lithium-titanium composite oxide ($Li_{4+x}Ti_5O_{12}$ (the subscript x varies between 0 and 3 depending on the charge-and-discharge state)) having a spinel-type crystal structure and lithium titanate ($Li_{2+x}Ti_3O_7$ (the subscript x varies between 0 and 2 depending on the charge-and-discharge state)) having a ramsdellite type crystal structure, monoclinic titanium dioxide ($Li_xTiO_2$ (B) (the subscript x varies between 0 and 1 depending on the charge-and-discharge state)), and monoclinic niobium-titanium composite oxide (for example, $Li_xNb_2TiO_7$ (subscript x varies between 0 and 4 depending on the charge and discharge state)). The negative electrode may contain one or more of negative electrode active materials. More preferably, the negative electrode active material is lithium-titanium composite oxide having a spinel-type crystal structure.

The negative electrode active material may be contained in the negative electrode mixture layer in a form of particles. The average primary particle size of negative electrode active material particles is preferably 5 µm or less. If the average primary particle size is 5 µm or less, a sufficient effective area contributing to an electrode reaction can be secured so that good large-current discharge characteristics can be obtained.

Negative electrode active material particles preferably have a specific surface area of 1 to 10 $m^2/g$. If the specific surface area is 1 $m^2/g$ or more, the effective area contributing to an electrode reaction is sufficient and good large-current discharge characteristics can be obtained. On the other hand, if the specific surface area is 10 $m^2/g$ or less, a reaction with the nonaqueous electrolyte is inhibited and the degradation of charge-and-discharge efficiency and gas generation during storage can be inhibited.

The conductive agent is used to improve current-collecting performance when necessary. An example of the conductive agent is a carbon material. The carbon material preferably has high absorption-properties of alkali metal and high conductivity. Examples of the carbon material include acetylene black and carbon black.

The binder is used to bind negative electrode active material particles and the negative electrode current collector. Examples of the binder include polytetrafluoroethylene (PTFE), polyvinylidene fluoride (PVdF), fluororubber, styrene-butadiene rubber (SBR), polypropylene (PP), polyethylene (PE), and carboxymethyl cellulose (CMC).

The ratio of the negative electrode active material, the conductive agent, and the binder contained in the negative electrode mixture layer is preferably 70 to 95% by weight, 0 to 25% by weight, and 2 to 10% by weight respectively.

The negative electrode can be produced by the procedure shown below, for example. First, the negative electrode active material, the conductive agent, and the binder are put into an appropriate solvent, for example, N-methylpyrolidone to prepare slurry. The slurry is applied onto the surface of the negative electrode current collector and the applied coat is dried. The dried applied coat is pressed to produce a negative electrode mixture layer having a desired density, and thus a negative electrode can be obtained.

(2) Positive Electrode

As the positive electrode current collector, a sheet containing a material of high electric conductivity can be used. For example, aluminum foil or aluminum alloy foil can be used as the positive electrode current collector. When aluminum foil or aluminum alloy foil is used, the thickness thereof is, for example, 20 μm or less and preferably 15 μm or less. The aluminum alloy foil may contain magnesium, zinc, silicon or the like. In addition, the content of transition metal such as iron, copper, nickel, and chromium contained in the aluminum alloy foil is preferably 1% or less.

The conductive agent is used to improve current-collecting performance when necessary. Examples of the conductive agent include acetylene black, carbon black, and graphite.

The binder is used to bind the positive electrode active material and the positive electrode current collector. Examples of the binder include polytetrafluoroethylene (PTFE), polyvinylidene fluoride (PVdF), fluororubber, styrene-butadiene rubber (SBR), polypropylene (PP), polyethylene (PE), and carboxymethyl cellulose (CMC).

The ratio of the positive electrode active material, the conductive agent, and the binder contained in the positive electrode mixture layer is preferably 80 to 95% by weight, 3 to 20% by weight, and 2 to 7% by weight respectively.

The positive electrode can be produced by the procedure shown below, for example. First, the positive electrode active material containing the manganese-containing composite oxide, the optional second positive electrode active material, the conductive agent, and the binder are put into an appropriate solvent, for example, N-methylpyrolidone to prepare slurry. The slurry is applied to the surface of the positive electrode current collector and the applied coat is dried. The dried applied coat is pressed to produce a positive electrode mixture layer having a desired density, and thus the positive electrode can be obtained.

(3) Separator

The separator is made of an insulating material and can prevent electric contact between the positive electrode and the negative electrode. Preferably, the separator is made of a material through which the nonaqueous electrolyte can pass or has a shape through which the nonaqueous electrolyte can pass. Examples of the separator include nonwoven fabric made of synthetic resin, a polyethylene porous film, a polypropylene porous film, and a cellulose separator.

(4) Nonaqueous Electrolyte

The nonaqueous electrolyte can contain, for example, a nonaqueous solvent, an electrolyte dissolved in the nonaqueous solvent, and additives.

The nonaqueous solvent may be any known nonaqueous solvent used for nonaqueous electrolyte batteries. A first example of the nonaqueous solvent is cyclic carbonate such as ethylene carbonate (EC) and propylene carbonate (PC). A second example of the nonaqueous solvent is chain carbonate such as dimethyl carbonate, methylethyl carbonate, and diethyl carbonate; γ-butyrolactone, acetonitrile, methyl propionate, ethyl propionate; cyclic ether such as tetrahydrofuran and 2-methyl tetrahydrofuran; and chain ether such as dimethoxy ethane and diethoxy ethane. Compared with the solvent of the first example, the solvent of the second example has generally lower viscosity. In addition, the nonaqueous solvent may be a solvent obtained by mixing the solvent of the first example with the solvent of the second example.

The electrolyte is, for example, alkali salt and preferably lithium salt. The electrolyte preferably contains at least one lithium salt in which the van der Waals ionic radius of anion is 0.25 nm or more and 0.4 nm or less. Examples of such lithium salt include lithium hexafluorophosphate ($LiPF_6$), lithium hexafluoroarsenate ($LiAsF_6$), and lithium trifluoromethanesulfonate ($LiCF_3SO_3$). The electrolyte is preferably lithium hexafluorophosphate ($LiPF_6$) The concentration of electrolyte in the nonaqueous electrolyte is preferably 0.5 to 2 mol/L.

(5) Negative Electrode Terminal and Positive Electrode Terminal

The negative electrode terminal and the positive electrode terminal are preferably formed from a material of high electric conductivity. When connected to a current collector, these terminals are preferably made of the material similar to that of the current collector to reduce contact resistance.

(6) Container Member

The container member is not particularly limited, though, for example, a metallic container or a container made of laminate film may be used.

By using a metallic container as the container member, a nonaqueous electrolyte battery superior in impact resistance and long-term reliability can be realized. By using a container made of laminate film as the container member, a nonaqueous electrolyte battery superior in corrosion resistance can be realized and also the weight of the nonaqueous electrolyte battery can be reduced.

A metallic container that has a wall thickness within the range of, for example, 0.2 to 5 mm can be used. The metallic container preferably has a wall thickness of 0.5 mm or less.

The metallic container preferably contains at least one selected from the group consisting of Fe, Ni, Cu, Sn, and Al. The metallic container can be produced from, for example, aluminum or aluminum alloys. The aluminum alloy is preferably an alloy containing elements such as magnesium, zinc, silicon and the like. If a transition metal such as iron, copper, nickel, or chromium is contained in the alloy, the content thereof is preferably 1% by weight or less. Therfore, long-term reliability and impact resistance can dramatically be improved in a high-temperature environment.

A container made of laminate film that has a wall thickness within the range of, for example, 0.1 to 2 mm can be used. The laminate film preferably has a thickness of 0.2 mm or less.

A multilayer film containing a metal layer and resin layers sandwiching the metal layer therebetween can be used as the laminate film. The metal layer preferably contains at least one element selected from the group consisting of Fe, Ni, Cu, Sn, and Al. The metal layer may also contain an alloy. The metal layer is preferably aluminum foil or aluminum alloy foil for the weight reduction. As the resin layer, a polymeric material such as, for example, polypropylene (PP), polyethylene (PE), nylon, and polyethylene terephthalate (PET), can be used. The laminate film can be formed into the shape of a container member by sealing through heat-sealing.

The shape of the container member includes the flat type (thin type), rectangular type, cylindrical type, coin type, and button type. The container member can adopt various dimensions in accordance with uses. For example, when a nonaqueous electrolyte battery according to the first embodiment is used for uses of mobile electronic devices, the container member can be made a small type adapted to the size of the electronic device to be mounted on. Alternatively, when the battery is a nonaqueous electrolyte battery mounted on two-wheeled or four-wheeled vehicles, the container may be a large-battery container.

(Method of Adjusting Ratio p/n of Capacity p Per Unit Area of Positive Electrode to Capacity n Per Unit Area of Negative Electrode in Nonaqueous Electrolyte Battery)

The ratio p/n of the capacity p per unit area of the positive electrode to the capacity n per unit area of the negative electrode in a nonaqueous electrolyte battery can be adjusted by, for example, the amount of coating (positive electrode: $M_{sc}$; negative electrode: $M_{sa}$) per unit area 1 m² of the electrode mixture layer after drying, the capacity (positive electrode: $C_{mc}$; negative electrode: $C_{ma}$) per weight of the active material, and the weight ratio (positive electrode: $P_{ac}$; negative electrode: $P_{aa}$) of the active material in the electrode mixture layer, for the positive electrode and the negative electrode.

If the amount of coating per unit area of the electrode mixture layer after drying is $M_s$ (g/m²), the capacity per weight of the active material is $C_m$ (mAh/g), and the weight ratio of the active material in the electrode mixture layer is $P_a$, the electric capacity $C_s$ (mAh/m²) per unit area 1 m² of the electrode is calculated by (Formula 1):

$$C_s = C_m \times M_s \times P_a \quad \text{(Formula 1)}$$

If, for the positive electrode, the amount of coating per unit area 1 m² of the positive electrode mixture layer after drying is $M_{sc}$, the capacity per weight of the positive electrode active material is $C_{mc1}$, the weight ratio of the positive electrode active material in the positive electrode mixture layer is $P_{ac1}$, and the electric capacity per unit area 1 m² of the positive electrode is $C_{sc}$ and, for the negative electrode, the amount of coating per unit area 1 m² of the negative electrode mixture layer after drying is $M_{sa}$, the capacity per weight of the negative electrode active material is $C_{ma1}$, the weight ratio of the negative electrode active material in the negative electrode mixture layer is $P_{aa1}$, and the electric capacity per unit area 1 m² of the negative electrode is $C_{sa}$, the ratio p/n is calculated by (Formula 2) shown below:

$$p/n = C_{sc}/C_{sa} = (C_{mc1} \times M_{sc1} \times P_{ac1})/(C_{ma1} \times M_{sa1} \times P_{aa1}) \quad \text{(Formula 2)}$$

From the above formula, it is evident that the ratio p/n is a function of the amount of coating per unit area 1 m² of the electrode mixture layer after drying, the capacity per weight of the active material, and the weight ratio of the active material in the mixture layer.

Formula 2 is transformed to obtain Formula 3 as follows:

$$M_{sc}/M_{sa} = (p/n) \times (C_{ma1} \times P_{aa1})/(C_{mc1} \times P_{ac1}) \quad \text{(Formula 3)}$$

The capacity (positive electrode: $C_{mc1}$; negative electrode: $C_{ma1}$) per weight of the active material can be adjusted by selecting the active material. The weight ratio (positive electrode: $P_{ac1}$; P negative electrode: $P_{aa1}$) of the active material in the electrode mixture layer can be adjusted by changing the ratio of the active material in the slurry to form the electrode mixture layer. If the type of the active material and the composition of the slurry are determined for each of the positive electrode and the negative electrode, the product $C_{ma1} \times P_{aa1}$ and the product $C_{mc1} \times P_{ac1}$ in Formula 3 are constant and the ratio p/n becomes a function of the ratio $M_{sc}/M_{sa}$. In this case, therefore, the ratio p/n can be adjusted by adjusting the coating amount $M_{sc}$ per unit area 1 m² of the positive electrode mixture layer after drying and adjusting the coating amount $M_{sa}$ per unit area 1 m² of the negative electrode mixture layer after drying.

If any second positive electrode active material is contained in the positive electrode mixture layer, (Formula 2) and (Formula 3) shown above are rewritten to (Formula 4) and (Formula 5) shown below respectively. In (Formula 4) and (Formula 5) as follows, $C_{mc2}$ and $P_{ac2}$ are the capacity per weight of the second positive electrode active material and the weight ratio of the second positive electrode active material in the electrode mixture layer, respectively.

$$p/n = C_{sc}/C_{sa} = \{(C_{mc1} \times M_{sc} \times P_{ac1}) + (C_{mc2} \times M_{sc} \times P_{ac2})\} / (C_{ma1} \times M_{sa} \times P_{aa1}) \quad \text{(Formula 4)}$$

$$M_{sc}/M_{sa} = (p/n) \times (C_{ma1} \times P_{aa1})/\{(C_{mc1} \times P_{ac1}) + (C_{mc2} \times P_{ac2})\} \quad \text{(Formula 5)}$$

(Measuring Method of Ratio p/n)

The ratio p/n of the capacity p per unit area of the positive electrode to the capacity n per unit area of the negative electrode in a nonaqueous electrolyte battery can be calculated from the capacity per unit area of the current collector for the electrode mixture layer held on one side of each electrode. Specifically as follows:

1. Sampling

Figure 2:
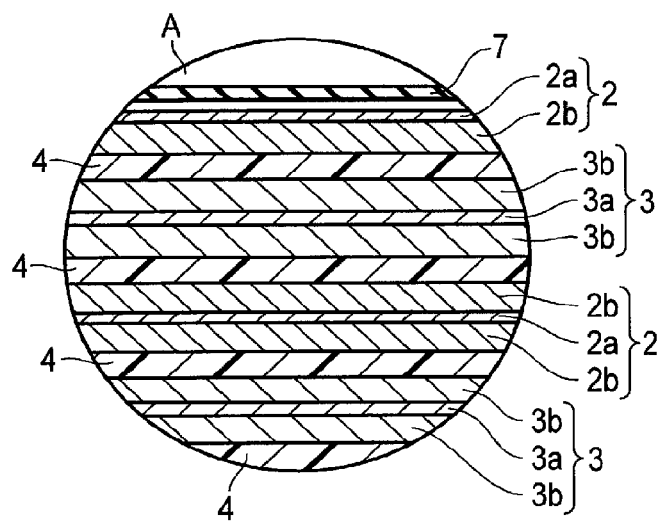
FIG. 2 is an enlarged sectional view of an A portion in FIG. 1.

First, a nonaqueous electrolyte battery to be measured is provided. The provided nonaqueous electrolyte battery is subjected to discharge until the battery voltage becomes 1.5 V or less. Next, the discharged nonaqueous electrolyte battery is disassembled in an inert atmosphere of argon or the like. The electrode group is taken out from the disassembled nonaqueous electrolyte battery. At this time care should be taken so that the positive electrode and the negative electrode do not electrically come into contact. The electrode group is taken out in a state in which, as shown in FIG. 2 described below, a repeated structure of—positive electrode-separator-negative electrode-separator-positive electrode—is maintained. The taken-out electrode group is separated into the separators, positive electrodes, and negative electrodes using, for example, insulating tweezers made of ceramics. The positive electrodes and negative electrodes thus obtained are cleaned by each being soaked in an organic solvent of ethylmethyl carbonate or the like. After the cleaning, the positive electrodes and negative electrodes are dried.

If each electrode mixture layer is held on both sides of the current collecting foil, the mixture layer on one side is removed by dissolving the mixture layer using a solvent such as N-methylpyrolidone.

Next, electrode pieces of the size of 2 cm square are cut from each of the positive electrode and the negative electrode using a cutter, scissors, or a photo cutter. These electrode pieces are used as positive electrode samples and negative electrode samples. Each ten samples are respectively gathered as positive electrode samples and negative electrode samples.

2. Charge and Discharge Test

Next, each of the positive electrode samples fabricated as described above is used as a working electrode and metal lithium is used as a counter electrode and a reference electrode to fabricate 10 three-pole cells. Similarly, each of the negative electrode samples fabricated as described above is used as a working electrode to fabricate another set of 10 three-pole cells. These three-pole cells are subjected to a charge-and-discharge test according to the following procedure.

First, the three-pole cell is charged. As charge conditions, the current density is set to 0.3 mA/cm². The charge voltage is set to 4.3 V for the three-pole cell of the positive electrode, and 1.3 V for the three-pole cell of the negative electrode. The charging is performed for 10 hours under an environment of 25° C.

After charging, a pause is taken for 10 minutes. Subsequently, the three-pole cell is discharged. As discharge conditions, the current density is set to 0.3 mA/cm². The final discharge voltage is set to 3.0 V for the three-pole cell of the positive electrode and 1.8 V for the three-pole cell of the negative electrode. The discharge is performed under the condition of a constant current under an environment of 25° C. The discharge capacity during the discharge is measured and the obtained discharge capacity is set as a current value that can be discharged in an hour, that is, 1 C.

Next, the three-pole cell is recharged. As charge conditions, the current value is set to 0.2 C. The charge voltage is set to 4.3 V for the three-pole cell of the positive electrode and 1.3 V for the three-pole cell of the negative electrode. This charge is performed under an environment of 25° C. until the current value becomes 0.05 C.

After charging, a pause is taken for 10 minutes. Subsequently, the three-pole cell is discharged. As discharge conditions, the current value is set to 0.2 C. The final discharge voltage is set to 3.0 V for the three-pole cell of the positive electrode and 1.8 V for the three-pole cell of the negative electrode. The discharge is performed under the condition of a constant current under an environment of 25° C. The discharged amount during the discharge is measured as a discharge capacity at 0.2 C.

The discharge capacity at 0.2 C of the 10 three-pole cells produced by using positive electrode samples is defined as the capacity p per unit area of the positive electrode. Also, the discharge capacity at 0.2 C of the 10 three-pole cells produced by using negative electrode samples is defined as the capacity n per unit area of the negative electrode. By using the capacity p and the capacity n thus obtained, the capacity ratio p/n can be calculated.

<Method of Confirming Composition of Manganese-Containing Composite Oxide having Spinel-Type Crystal Structure>

The composition of the active material contained in the positive electrode can be confirmed according to the following procedure.

The nonaqueous electrolyte battery is disassembled in the same manner as the method of sampling described in the measuring method of the ratio p/n and the positive electrode is separated from the electrode group. The type of the active material is identified by applying the inductively coupled plasma emission spectrochemical analysis (ICP analysis), SEM-EDX, and powder X-ray diffraction to the obtained positive electrode.

In the ICP analysis, measurement is made as follows. About 2 g of mixture powder is stripped from the positive electrode previously separated by scraping the powder using a spatula or the like. The obtained powder is subjected to the ICP analysis. From the ICP analysis, the weight ratio of typical metallic elements and transition metal elements is calculated.

In SEM-EDX, measurement is made as described below. Electrode pieces of the size of about 1 cm square are cut from the separated positive electrode using a cutter, scissors or the like. The electrode pieces are stuck to a dedicated sample holder while being placed flatly thereon using conductive carbon tape or the like. An element distribution image (mapping image) of Mn, Ni, Co, Al, and O is acquired by EDX mapping measurement of a region of about 100 μm square on the top surface of the electrode piece. On the other hand, mixture powder is stripped from the positive electrode previously-separated, and subjected to power X-ray diffraction measurement. Several tens of mg of mixture powder are stripped from the positive electrode by scraping the powder using a spatula or the like. The stripped powder is ground in an agate mortar such that coarse particles having a particle size of 50 μm or more disappear. Powder X-ray diffraction measurement of the obtained powder is made in a scan speed of 0.05°/s within a 2θ range of 10° or more and 90° or less. From the SEM-EDX mapping image and powder X-ray diffraction measurement thus obtained, the type and number of positive electrode active materials can be identified.

From the SEM-EDX mapping image, metallic elements contained in transition metal composite oxide particles can be identified by confirming the element distribution. If a metallic element (excluding Li) common between the first and second active materials is contained, the ratio of the number of atoms of each metallic element between active materials can be calculated. An average value of the values calculated from different mapping data of 10 locations is to be the calculated value of the ratio of the number of atoms.

On the other hand, the crystal structure of the active material contained in the positive electrode can be identified from a powder X-ray diffraction pattern. If the positive electrode mixture layer contains a second positive electrode active material other than manganese-containing composite oxide having a spinel-type crystal structure, the second positive electrode active material has a lattice constant or a crystal structure each of which is different from that of the manganese-containing composite oxide having a spinel-type crystal structure and thus, the presence thereof can be verified by the powder X-ray diffraction measurement.

Therefore, by combining SEM-EDX and the powder X-ray diffraction measurement, the type and number of positive electrode active materials and the ratio of the number of metallic atoms can be identified.

From the weight ratio of metallic elements in the positive electrode mixture layer obtained from the ICP analysis as described above and the ratio of the number of metallic atoms between active materials obtained from SEM-EDX as described above, the molar ratio of M (M=Mg, Ti, Cr, Fe, Co, Zn, Al, Ga) and Mn in the manganese-containing composite oxide is obtained, and x in the general formula of $Li_{1-a}Mn_{2-x}M_xO_4$ can be calculated. Similarly, regarding the second positive electrode active material, the active material composition can be identified by combining the powder X-ray diffraction pattern, the ICP analysis, and SEM-EDX.

(Measuring Method of Average Operating Voltage)

An open circuit cell voltage ($OCV_{50}$) in a state having a charging rate of 50% with respect to the nominal capacity is used as a barometer of the average operating voltage of a battery. $OCV_{50}$ is measured as follows.

First, the battery is charged for half an hour at the current rate of 1 C under an environment of 25° C. such that the charging rate of 50% with respect to the nominal capacity is reached. After being charged, the battery is left alone for one hour under an environment of 25° C., and then the cell voltage is measured and the value thereof is set as $OCV_{50}$.

Here, the nominal capacity is an electric capacity when the battery is charged up to the final charge voltage by the method specified by the manufacturer in an ambient temperature of 20±5° C. and then the battery is discharged at constant currents of the rate of 0.2 C until the battery voltage becomes the final discharge voltage. The method of calculating the nominal capacity is the method specified in JIS C8711.

<Capacity of Second Positive Electrode Active Material>

When the positive electrode contains the second positive electrode active material, the composition thereof can be confirmed by, as described above, combining the powder X-ray diffraction pattern, the ICP analysis, and SEM-EDX. The capacity per weight of the second positive electrode active material in the potential range of 3 V (vs. Li/Li$^+$) or more and 3.9 V (vs. Li/Li$^+$) or less with respect to the oxidation-reduction potential of the metal Li can be estimated from the checked composition.

Next, an example of the nonaqueous electrolyte battery according to the first embodiment will be described in still more detail with reference to the drawings.

FIG. 1 is a partially cut-out perspective view of a first example of a nonaqueous electrolyte battery according to the first embodiment. FIG. 2 is an enlarged sectional view of an A portion of the nonaqueous electrolyte battery shown in FIG. 1.

A nonaqueous electrolyte battery 100 shown in FIGS. 1 and 2 include a flat electrode group 1.

The flat electrode group 1 contains a negative electrode 2, a positive electrode 3, and a separator 4. As shown in FIG. 2, the negative electrode 2 includes a negative electrode current collector 2a and a negative electrode mixture layer 2b held on the negative electrode current collector 2a. Also as shown in FIG. 2, the positive electrode 3 includes a positive electrode current collector 3a and a positive electrode mixture layer 3b held on the positive electrode current collector 3a.

In the electrode group 1, as shown in FIG. 2, the negative electrode 2 and the positive electrode 3 are laminated with the separator 4 sandwiched between the negative electrode mixture layer 2b and the positive electrode mixture layer 3b. The electrode group 1 as described above can be obtained by the procedure below. First, one negative electrode 2 in the shape of a flat plate and one positive electrode 3 in the shape of a flat plate are laminated with the separator 4 sandwiched therebetween. Next, another separator 4 is laminated on the positive electrode mixture layer 3b that is not opposed to the negative electrode 2 to form a laminate. The laminate is coiled with the negative electrode 2 on the outer side. Next, after a coiling core being pulled out, the laminate is pressed into a flat shape. Thus, the electrode group 1 shown in FIGS. 1 and 2 can be obtained.

A strip negative electrode terminal 5 is electrically connected to the negative electrode 2. Also, a strip positive electrode terminal 6 is electrically connected to the positive electrode 3.

The nonaqueous electrolyte battery 100 shown in FIGS. 1 and 2 further includes a container bag 7 made of laminate film as a container.

The electrode group 1 is housed in the container bag 7 made of laminate film in a state in which ends of the negative electrode terminal 5 and the positive electrode terminal 6 are projected out from the container bag 7. A nonaqueous electrolyte (not shown) is housed inside the container bag 7 made of laminate film. The electrode group 1 is impregnated with the nonaqueous electrolyte. An edge portion of the container bag 7 is heat-sealed, thereby sealing the electrode group 1 and the nonaqueous electrolyte.

Next, a second example of the nonaqueous electrolyte battery according to the first embodiment will be described in detail with reference to FIG. 3.

Figure 3:
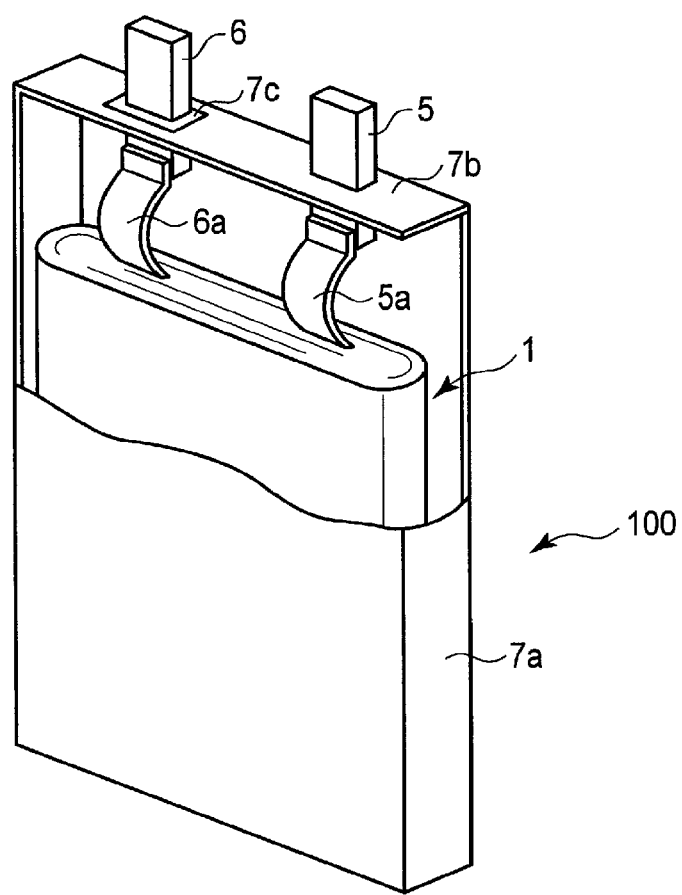
FIG. 3 is a partially cut-out perspective view of a second example of the nonaqueous electrolyte battery according to the first embodiment.

FIG. 3 is a partially cut-out perspective view of a second example of the nonaqueous electrolyte battery according to the first embodiment.

The nonaqueous electrolyte battery 100 shown in FIG. 3 is significantly different from the nonaqueous electrolyte battery 100 in the first example in that the container member is constituted by a container 7a made of metal and a sealing plate 7b.

The nonaqueous electrolyte battery 100 shown in FIG. 3 includes the electrode group 1 similar to the electrode group 1 of the nonaqueous electrolyte battery 100 in the first example. The second example shown in FIG. 3 is different from the first example in that a member 5a which is used as the negative electrode terminal 5 in the first example is used as a negative electrode tab and a member 6a which is used as the positive electrode terminal 6 in the first example is used as a positive electrode tab.

In the nonaqueous electrolyte battery 100 shown in FIG. 3, the electrode group 1 as described above is housed in the metallic container 7a. The metallic container 7a further houses the nonaqueous electrolyte. The metallic container 7a is sealed by the sealing plate 7b made of metal.

The sealing plate 7b is provided with the negative electrode terminal 5 and the positive electrode terminal 6. An insulating member 7c is arranged between the positive electrode terminal 6 and the sealing plate 7b. Accordingly, the positive electrode terminal 6 and the sealing plate 7b are electrically insulated.

As shown in FIG. 3, the negative electrode terminal 5 is connected to the negative electrode tab 5a. Similarly, the positive electrode terminal 6 is connected to the positive electrode tab 6a.

A nonaqueous electrolyte battery according to the first embodiment contains the positive electrode active material containing a manganese-containing composite oxide represented by the general formula of $Li_{1-a}Mn_{2-x}M_xO_4$ in the positive electrode and the negative electrode active material selected from the group consisting of titanium oxide and titanium-containing composite oxide in the negative electrode. In addition, the ratio p/n of the capacity p per unit area of the positive electrode to the capacity n per unit area of the negative electrode is within the range of 0.8 or more and 1 or less. Thanks to that, the nonaqueous electrolyte battery according to the first embodiment can achieve an effect of increasing the average operating voltage and an effect of inhibiting input-and-output characteristics degradation caused by degradation of the positive electrode under a high-temperature environment at the same time. As a result, the nonaqueous electrolyte battery according to the first embodiment can exhibit a high average-operating-voltage and also exhibit excellent high-temperature durability.

Second Embodiment

According to the second embodiment, a battery pack is provided. The battery pack includes a nonaqueous electrolyte battery according to the first embodiment.

The battery pack according to the second embodiment can include a plurality of nonaqueous electrolyte batteries. The plurality of nonaqueous electrolyte batteries can be electrically connected to each other in series or may be electrically connected to each other in parallel. Alternatively, the plurality of nonaqueous electrolyte batteries can be connected to each other by combining a series connection and a parallel connection.

For example, a battery pack according to the second embodiment can include five nonaqueous electrolyte batteries each of which is according to the first embodiment. These nonaqueous electrolyte batteries can be connected to each other in series. The nonaqueous electrolyte batteries connected in series can constitute a battery module. That is, the battery pack according to the second embodiment can include a battery module.

The battery pack according to the second embodiment can include a plurality of battery modules. The plurality of battery modules can be connected in series, in parallel, or by combining the series connection and the parallel connection.

Hereinafter, an example of the battery pack according to the second embodiment will be described with reference to FIGS. 4 and 5.

Figure 4:
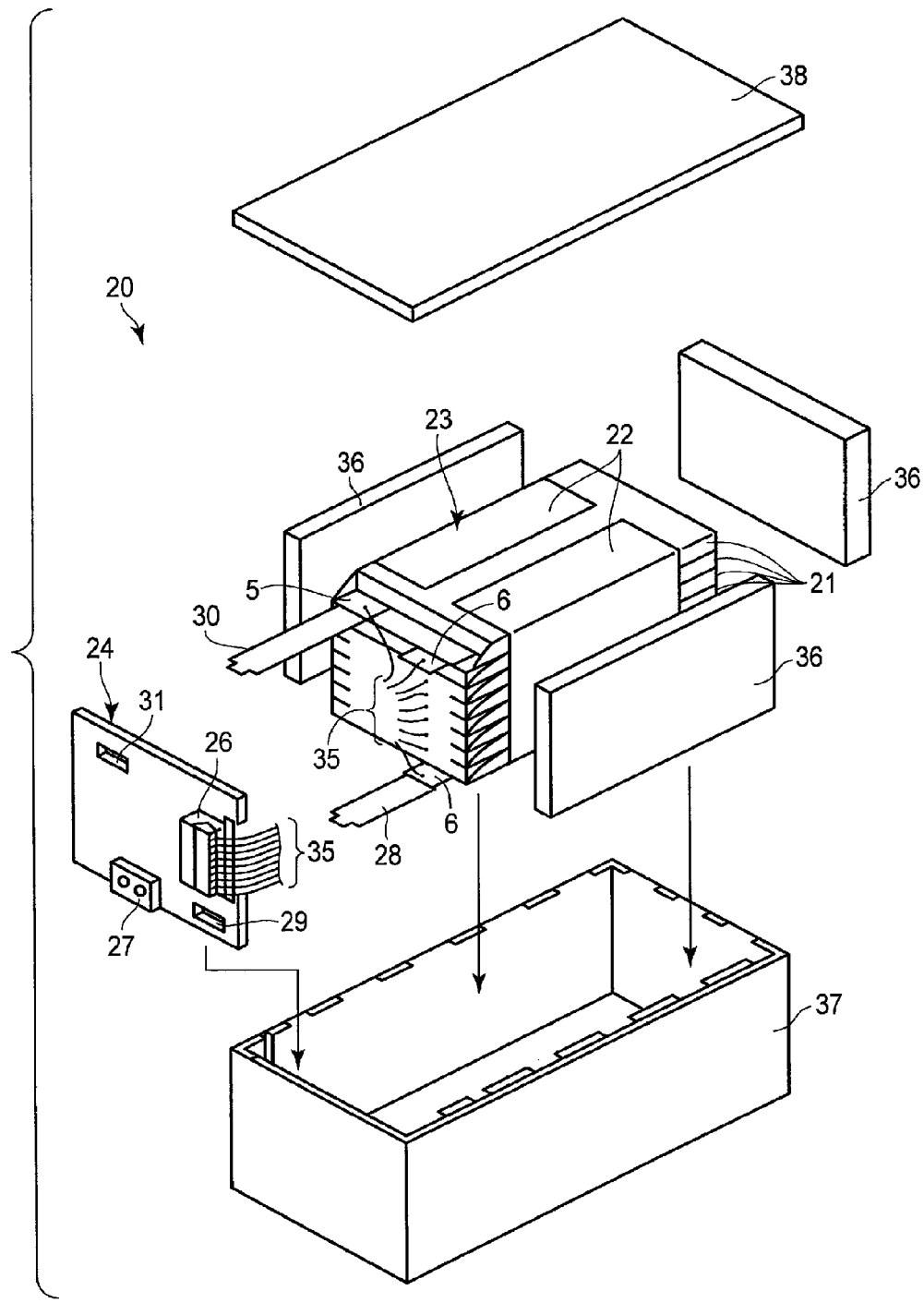
FIG. 4 is an exploded perspective view of an example of a battery pack according to the second embodiment.

FIG. 4 is an exploded perspective view of an example of a battery pack according to the second embodiment. FIG. 5 is a block diagram showing an electric circuit of the battery pack shown in FIG. 4.

Figure 5:
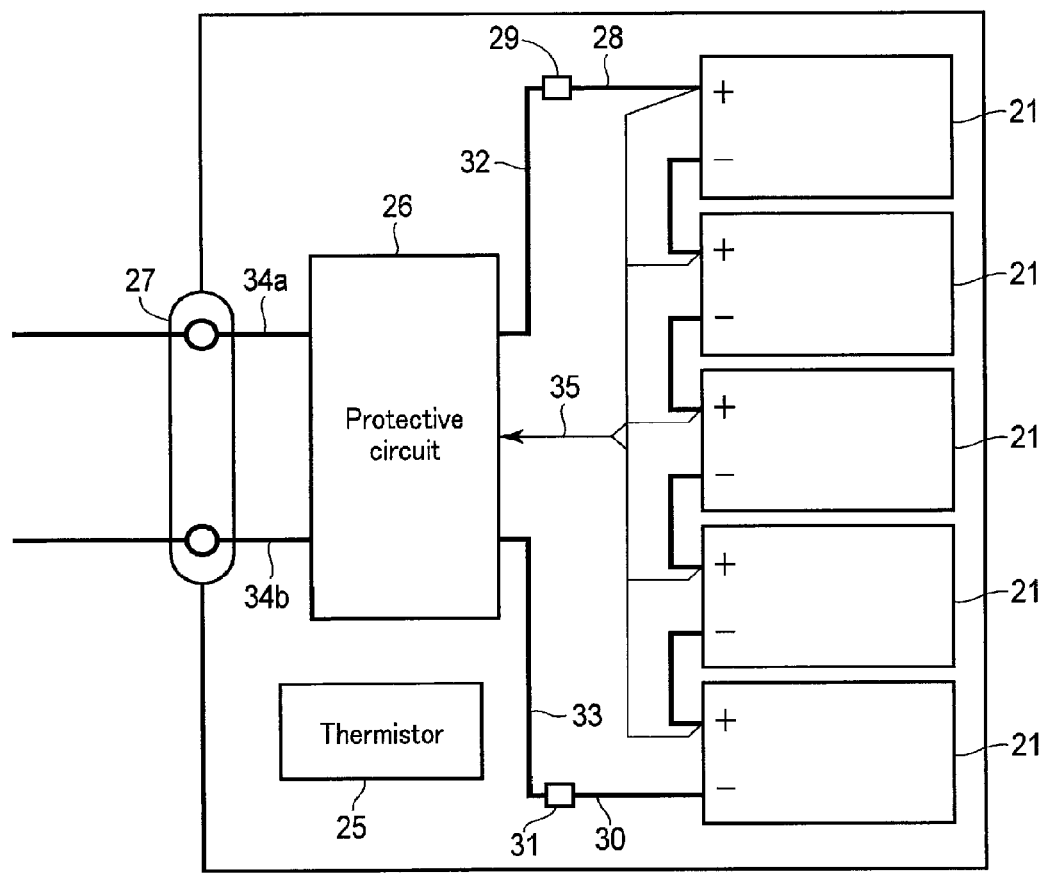
FIG. 5 is a block diagram showing an electric circuit of the battery pack shown in FIG. 4.

A battery pack 20 shown in FIGS. 4 and 5 includes five unit cells 21. Each of the unit cells 21 is an example of the flat nonaqueous electrolyte battery 100 according to the first embodiment described with reference to FIG. 3.

A plurality of the unit cells 21 is stacked such that the negative electrode terminal 5 and the positive electrode terminal 6 projecting to the outside are aligned in the same direction and a battery module 23 is constituted by the plurality of unit cells being fastened with an adhesive tape 22. As shown in FIG. 5, these unit cells 21 are electrically connected to each other in series.

A printed wiring board 24 is arranged opposite to the side on which the negative electrode terminal 5 and the positive electrode terminal 6 of the unit cell 21 project out. As shown in FIG. 5, a thermistor 25, a protective circuit 26, and an electric conduction terminal 27 to an external device are mounted on the printed wiring board 24. Incidentally, an insulating plate (not shown) is attached to the surface of the printed wiring board 24 opposite to the battery module 23 to avoid unnecessary connection to wires of the battery module 23.

A positive electrode side lead 28 is connected to the positive electrode terminal 6 positioned in the bottom layer of the battery module 23 and the tip thereof is inserted into a positive electrode side connector 29 of the printed wiring board 24 for electric connection. A negative electrode side lead 30 is connected to the negative electrode terminal 5 positioned in the top layer of the battery module 23 and the tip thereof is inserted into a negative electrode side connector 31 of the printed wiring board 24 for electric connection. These connectors 29 and 31 are connected to the protective circuit 26 via wires 32 and 33 formed in the printed wiring board 24, respectively.

The thermistor 25 detects the temperature of the unit cell 21 and a detection signal thereof is sent to the protective circuit 26. The protective circuit 26 can shot down a positive side wire 34a and a negative side wire 34b between the protective circuit 26 and the electric conduction terminal 27 to an external device under a predetermined condition. An example of the predetermined condition is, for example, when the detection temperature of the thermistor 25 reaches a predetermined temperature or higher. Another example of the predetermined condition is, for example, when an over-charge, an over-discharge, an over-current or the like of the unit cell 21 is detected. An over-charge/discharge or the like is detected for each of the unit cells 21 or the whole battery module 23. When each of the unit cells 21 is detected, the battery voltage may be detected or the positive electrode potential or negative electrode potential may be detected. In the latter case, a lithium electrode used as a reference electrode is inserted into each of the unit cells 21. For the battery pack 20 in FIGS. 4 and 5, a wire 35 for voltage detection is connected to each of the unit cells 21. A detection signal is sent to the protective circuit 26 through the wires 35.

A protective sheet 36 made of rubber or resin is arranged on three sides of the battery module 23 excluding the side on which the positive electrode terminal 6 and the negative electrode terminal 5 project out.

The battery module 23 is housed in a housing container 37 together with each of the protective sheets 36 and the printed wiring board 24. That is, the protective sheets 36 are arranged on both inner-side surfaces in a long side direction of the housing container 37 and on one inner-side surface in a short side direction, and the printed wiring board 24 is arranged on the other inner-side surface in the short side direction. The battery module 23 is located in a space surrounded by the protective sheets 36 and the printed wiring board 24. A cover 38 is attached to the top surface of the housing container 37.

In order to fix the battery module 23, a heat-shrinkable tape may be used in place of the adhesive tape 22. In this case, the protective sheet is arranged on both side faces of the battery module and a heat-shrinkable tube is wound around and then the heat-shrinkable tube is allowed to heat-shrink to tie the battery module up.

FIGS. 4 and 5 show a form in which the unit cells 21 are connected in series, but the unit cells may also be connected in parallel to increase the battery capacity. Also, the assembled battery packs can be connected in series and/or in parallel.

The aspect of a battery pack according to the second embodiment is appropriately changed according to its application. Applications of the battery pack according to the second embodiment are preferably those in which cycle characteristics in large-current characteristics are desired. Specific examples of these applications include application as a power source of a digital camera and application to a vehicle such as a two- or four-wheeled hybrid electric vehicle, a two- or four-wheeled electric vehicle or a power-assisted bicycle. Particularly preferably, the battery pack according to the second embodiment is used for a power source mounted to a vehicle.

A battery pack according to the second embodiment includes the nonaqueous electrolyte battery according to the first embodiment and thus can exhibit a high average-operating-voltage and also exhibit excellent high-temperature durability.

EXAMPLES

Hereinafter, the above embodiments will be described in more detail based on Examples.

Example 1-1

In Example 1-1, a nonaqueous electrolyte battery of Example 1-1 is produced by the following procedure.

<Production of Positive Electrode>

Powder of aluminum-substituted lithium manganate $LiMn_{1.6}Al_{0.4}O_4$ having a spinel-type crystal structure is provided, as the positive electrode active material. The oxide is one in which a portion of Mn of lithium manganate $LiMn_2O_4$ having a spinel-type crystal structure was substituted by aluminum, and in which M is Al and x=0.4 in the general formula of $LiMn_{2-x}M_xO_4$.

91% by weight of the active material powder, 2.5% by weight of acethylene black, 3% by weight of graphite, and 3.5% by weight of polyvinylidene fluoride (PVdF) were added to N-methylpyrolidone (NMP) and mixed to prepare slurry.

The slurry was applied to both sides of a current collector made of aluminum foil of 15 μm in thickness, and the applied coat was dried. Next, the dried applied coat was pressed. Thus, a positive electrode having a positive electrode mixture layer whose density was 2.8 g/cm³ was produced.

<Production of Negative Electrode>

Powder of lithium titanate $Li_4Ti_5O_{12}$ having a spinel-type crystal structure was provided, as the negative electrode active material. The spinel-type lithium titanate powder, graphite, acetylene black, and PVdF were added to NMP and mixed to prepare slurry. In this case, the mixing ratio of the spinel-type lithium titanate powder:graphite:acetylene black:PVdF was set to 85% by weight:5% by weight:3% by weight:7% by weight.

Subsequently, the slurry was applied to both sides of a current collector made of aluminum foil of 11 μm in thickness, and the applied coat was dried. Next, the dried applied coat was pressed. Thus, a negative electrode having a negative electrode mixture layer whose density was 2.0 g/cm³ was produced.

<Fabrication of Electrode Group>

The positive electrode produced as described above, a separator made of a polyethylene porous film of 20 μm in thickness, the negative electrode produced as described above, and another separator were laminated in this order, and then the laminate was coiled in a spiral form such that the negative electrode was positioned on the outermost circumference to fabricate an electrode group. The electrode group was hot-pressed at 90° C. to fabricate a flat electrode group having a width of 58 mm, a height of 95 mm, and a thickness of 3.0 mm.

The obtained electrode group was housed in a container bag made of laminate film having a thickness of 0.1 mm, which was constituted of aluminum foil whose thickness is 40 μm and polypropylene layers formed on both sides of the aluminum foil, and an edge portion of the container bag was heat-sealed while leaving an opening in a portion thereof. Next, the container bag was dried for 24 hours at 80° C.

<Preparation of Nonaqueous Electrolytic Solution>

Ethylene carbonate (EC) and methylethyl carbonate (MEC) were mixed in a volume ratio of 1:2 to prepare a mixed solvent. Lithium hexafluorophosphate ($LiPF_6$) was dissolved in the mixed solvent in the concentration of 1.0 mol/L to prepare a nonaqueous electrolytic solution.

<Production of Battery>

The nonaqueous electrolytic solution was injected into the container bag, in which the electrode group was previously housed, via the opening. Next, the container bag was sealed by heat-sealing the opening to produce a nonaqueous electrolyte battery of Example 1-1 having a structure similar to that shown in FIGS. 1 and 2. Another nonaqueous electrolyte battery in Example 1-1 was produced under similar production conditions.

<Conditioning to Initial State>

Next, these nonaqueous electrolyte batteries of Example 1-1 were subjected to the initial charge under an environment of 25° C. The charge condition was the rate of 0.2 C and the batteries were charged until the cell voltage become 2.8 V. Then, these nonaqueous electrolyte batteries of Example 1-1 were aged by preserving the batteries at an environmental temperature of 50° C. for 50 hours. Then, these nonaqueous electrolyte batteries of Example 1-1 are discharged at the rate of 0.2 C at an environmental temperature of 25° C. until the voltage of the battery reached to 1.5 V. Subsequently, these nonaqueous electrolyte batteries of Example 1-1 were charged up to the charging rate of 50%, which was defined as the initial state.

<Measurement of Capacity Ratio p/n of Positive Electrode Capacity p and Negative Electrode Capacity n>

For one nonaqueous electrolyte battery of Example 1-1 conditioned to the initial state, the capacity ratio p/n, that is, the ratio of the capacity p per unit area of the positive electrode to the capacity n per unit area of the negative electrode was measured by the procedure described above. The ratio p/n of the nonaqueous electrolyte battery of Example 1-1 was 0.98.

Example 1-2

In Example 1-2, two nonaqueous electrolyte batteries of Example 1-2 are produced in the same manner as in Example 1-1 except that powder of aluminum-substituted lithium manganate $LiMn_{1.3}Al_{0.7}O_4$ having a spinel-type crystal structure was used as the positive electrode active material and that, accompanying the change of the positive electrode active material used, the capacity p per unit area of the positive electrode was made similar to the capacity p per unit area of the positive electrode in Example 1-1 by adjusting the coating amount of the positive electrode slurry on the current collector. The positive electrode active material used was one in which a portion of Mn of lithium manganate $LiMn_2O_4$ having a spinel-type crystal structure was substituted by aluminum, and in which M is Al and x=0.7 in the general formula of $LiMn_{2-x}M_xO_4$.

The produced nonaqueous electrolyte batteries of Example 1-2 were conditioned to the initial state by the procedure similar to that in Example 1-1. Subsequently, the capacity ratio p/n of one nonaqueous electrolyte battery in Example 1-2 conditioned to the initial state was measured by the procedure similar to the above-described procedure. The ratio p/n of the nonaqueous electrolyte battery of Example 1-2 was 0.98, as that in Example 1-1.

Example 1-3

In Example 1-3, nonaqueous electrolyte batteries of Example 1-3 were produced in the same manner as in Example 1-1 except that powder of aluminum-substituted lithium manganate $LiMn_{1.75}Al_{0.25}O_4$ having a spinel-type crystal structure was used as the positive electrode active material and that, accompanying the change of the positive electrode active material used, the capacity p per unit area of the positive electrode was made similar to the capacity p per unit area of the positive electrode in Example 1-1 by adjusting the coating amount of the positive electrode slurry on the current collector. The positive electrode active material used was one in which a portion of Mn of lithium manganate $LiMn_2O_4$ having a spinel-type crystal structure was substituted by aluminum, and in which M is Al and x=0.25 in the general formula of $LiMn_{2-x}M_xO_4$.

The produced nonaqueous electrolyte batteries of Example 1-3 were conditioned to the initial state by the procedure similar to that in Example 1-1. Subsequently, the capacity ratio p/n of one nonaqueous electrolyte battery of Example 1-3 conditioned to the initial state was measured by the procedure similar to the above-described procedure. The ratio p/n of the nonaqueous electrolyte battery of Example 1-3 was 0.98, as that in Example 1-1.

Examples 2-1 to 2-5

In each of Examples 2-1 to 2-5, two nonaqueous electrolyte batteries in each of Examples 2-1 to 2-5 were produced in the same manner as in Example 1-1 except that the positive electrode active material shown in Table 1 was used and that, accompanying the change of the positive electrode active material used, the capacity p per unit area of the positive electrode was made similar to the capacity p per unit area of the positive electrode in Example 1-1 by adjusting the coating amount of the positive electrode slurry on the current collector. That is, in Examples 2-1 to 2-5, powder of the element M-substituted lithium manganate in which the substitution element in the general formula of $LiMn_{2-x}M_xO_4$ was changed from Al to Mg, Cr, Fe, Co, and Ga was used respectively. Furthermore, in Example 2-1, the substitution amount x in the general formula of $LiMn_{2-x}M_xO_4$ was also changed to 0.27.

The produced nonaqueous electrolyte batteries of each Examples 2-1 to 2-5 were conditioned to the initial state by the procedure similar to that in Example 1-1. Subsequently, the capacity ratio p/n of one nonaqueous electrolyte battery in each of Examples 2-1 to 2-5 conditioned to the initial state is measured by the procedure similar to the above-described procedure. The ratio p/n of the nonaqueous electrolyte battery in each of Examples 2-1 to 2-5 was 0.98, as that in Example 1-1.

Example 3-1

In Example 3-1, two nonaqueous electrolyte batteries in Example 3-1 were produced in the same manner as in Example 1-1 except that the coating amount of the positive electrode slurry was reduced such that the capacity ratio p/n became 0.9.

The produced nonaqueous electrolyte batteries of Example 3-1 are conditioned to the initial state by the procedure similar to that in Example 1-1. Subsequently, the capacity ratio p/n of one nonaqueous electrolyte battery of Example 3-1 conditioned to the initial state was measured by the procedure similar to the above-described procedure. The ratio p/n of the nonaqueous electrolyte battery in Example 3-1 was 0.9.

Example 3-2

In Example 3-2, two nonaqueous electrolyte batteries of Example 3-2 were produced in the same manner as in Example 1-1 except that the coating amount of the positive electrode slurry was reduced such that the capacity ratio p/n becames 0.85.

The produced nonaqueous electrolyte batteries of Example 3-2 were conditioned to the initial state by the procedure similar to that in Example 1-1. Subsequently, the capacity ratio p/n of one nonaqueous electrolyte battery of Example 3-2 conditioned to the initial state was measured by the procedure similar to the above-described procedure. The ratio p/n of the nonaqueous electrolyte battery of Example 3-2 was 0.85.

Examples 4-1 to 4-3

In each of Examples 4-1 to 4-3, two nonaqueous electrolyte batteries of each of Examples 4-1 to 4-3 were produced in the same manner as in Example 1-1 except that the negative electrode active material was changed and that, accompanying the change of the negative electrode active material, the capacity n per unit area of the negative electrode was made similar to the capacity n per unit area of the negative electrode in Example 1-1 by adjusting the coating amount of the negative electrode slurry.

More specifically, in Example 4-1, lithium titanate (LTO (R)) having a ramsdellite type structure was used. In Example 4-2, monoclinic titanium dioxide ($TiO_2$ (B)) was used. In Example 4-3, monoclinic niobium-titanium composite oxide ($Nb_2TiO_7$ (NTO)) was used.

The produced nonaqueous electrolyte batteries of Examples 4-1 to 4-3 were conditioned to the initial state by the procedure similar to that in Example 1-1. Subsequently, the capacity ratio p/n of one nonaqueous electrolyte battery in each of Examples 4-1 to 4-3 conditioned to the initial state was measured by the procedure similar to the above-described procedure. The ratio p/n of the nonaqueous electrolyte battery in each of Examples 4-1 to 4-3 was 0.98, as that in Example 1-1.

Examples 5-1 to 5-3

In Examples 5-1 to 5-3, two nonaqueous electrolyte batteries of each of Examples 5-1 to 5-3 were produced in the same manner as in Example 1-1 except that the second positive electrode active material shown in below was further added and that, accompanying the use of the second positive electrode active material, the capacity p per unit area of the positive electrode was made similar to the capacity p per unit area of the positive electrode in Example 1-1 by adjusting the coating amount of the positive electrode slurry on the current collector.

In Example 5-1, powder of lithium-cobalt composite oxide $LiCoO_2$ was used, as the second positive electrode active material. Lithium-cobalt composite oxide $LiCoO_2$ used had a discharge capacity per gram of 65 mAh in the potential range of 3 V (vs. $Li/Li^+$) or more and 3.9 V (vs. $Li/Li^+$) or less at the current rate of 0.2 C. The lithium-cobalt composite oxide was added in an addition amount of relative weight 0.04 when the weight of powder of aluminum-substituted lithium manganate $LiMn_{1.6}Al_{0.4}O_4$ is defined as 1.

In Example 5-2, powder of lithium-cobalt composite oxide same as that used in Example 5-1 was used, as the second positive electrode active material. In Example 5-2, the lithium-cobalt composite oxide was added in an addition amount of relative weight 0.02 when the weight of powder of aluminum-substituted lithium manganate $LiMn_{1.6}Al_{0.4}O_4$ is defined as 1.

In Examples 5-3 and 5-4, powder of lithium-nickel-cobalt composite oxide $LiNi_{1/3}Co_{1/3}Mn_{1/3}O_2$ and powder of lithium iron phosphate $LiFePO_4$ were used, respectively, as the second positive electrode active material. Lithium-nickel-cobalt composite oxide $LiNi_{1/3}Co_{1/3}Mn_{1/3}O_2$ used had a discharge capacity per gram of 140 mAh in the potential range of 3 V (vs. $Li/Li^+$) or more and 3.9 V (vs. $Li/Li^+$) or less at the current rate of 0.2 C. Lithium iron phosphate $LiFePO_4$ used had a discharge capacity per gram of 115 mAh in the potential range of 3 V (vs. $Li/Li^+$) or more and 3.9 V (vs. $Li/Li^+$) or less at the current rate of 0.2 C. The addition amount of each of the second positive electrode active material was the same as in Example 5-1.

The produced nonaqueous electrolyte batteries in Examples 5-1 to 5-4 were conditioned to the initial state by the procedure similar to that in Example 1-1. Subsequently, the capacity ratio p/n of one nonaqueous electrolyte battery in each of Examples 5-1 to 5-4 conditioned to the initial state was measured by the procedure similar to the above-described procedure. The ratio p/n of the nonaqueous electrolyte battery in each of Examples 5-1 to 5-4 was 0.98, as that in Example 1-1.

Comparative Example 1-1

In Comparative Example 1-1, two nonaqueous electrolyte batteries of Comparative Example 1-1 were produced in the same manner as in Example 1-1 except that powder of aluminum-substituted lithium manganate $LiMn_{1.82}Al_{0.18}O_4$ having a spinel-type crystal structure is used as the positive electrode active material and that the capacity ratio p/n is changed to 1.2 by adjusting the coating amount of of the positive electrode slurry on the current collector based on the change of the positive electrode active material without changing the procedure for producing a negative electrode. The positive electrode active material used is one in which a portion of Mn of lithium manganate $LiMn_2O_4$ having a spinel-type crystal structure was substituted by aluminum, and in which M is Al and x=0.18 in the general formula of $LiMn_{2-x}M_xO_4$.

The produced nonaqueous electrolyte batteries of Comparative Example 1-1 were conditioned to the initial state by the procedure similar to that in Example 1-1. Subsequently, the capacity ratio p/n of one nonaqueous electrolyte battery of Comparative Example 1-1 conditioned to the initial state was measured by the procedure similar to the above-described procedure. The ratio p/n of the nonaqueous electrolyte battery in Comparative Example 1-1 was 1.2.

Comparative Example 1-2

In Comparative Example 1-2, two nonaqueous electrolyte batteries of Comparative Example 1-2 were produced in the same manner as in Example 1-1 except that powder of aluminum-substituted lithium manganate $LiMn_{1.15}Al_{0.85}O_4$ having a spinel-type crystal structure is used as the positive electrode active material and that the capacity ratio p/n is changed to 1.2 by adjusting the coating amount of the positive electrode slurry on the current collector based on the change of the positive electrode active material without changing the procedure for producing a negative electrode. The positive electrode active material used is one in which a portion of Mn of lithium manganate $LiMn_2O_4$ having a spinel-type crystal structure was substituted by aluminum, and in which M is Al and x=0.85 in the general formula of $LiMn_{2-x}M_xO_4$.

The produced nonaqueous electrolyte batteries of Comparative Example 1-2 were conditioned to the initial state by the procedure similar to that in Example 1-1. Subsequently, the capacity ratio p/n of one nonaqueous electrolyte battery of Comparative Example 1-2 conditioned to the initial state was measured by the procedure similar to the above-described procedure. The ratio p/n of the nonaqueous electrolyte battery in Comparative Example 1-2 was 1.2.

Comparative Example 2-1

In Comparative Example 2-1, two nonaqueous electrolyte batteries of Comparative Example 1-2 were produced in the same manner as in Example 1-1 except that the coating amount of the positive electrode slurry was increased such that the capacity ratio p/n become 1.2.

The produced nonaqueous electrolyte batteries of Comparative Example 2-1 were conditioned to the initial state by the procedure similar to that in Example 1-1. Subsequently, the capacity ratio p/n of one nonaqueous electrolyte battery of Comparative Example 2-1 conditioned to the initial state was measured by the procedure similar to the above-described procedure. The ratio p/n of the nonaqueous electrolyte battery of Comparative Example 2-1 was 1.2.

Comparative Example 2-2

In Comparative Example 2-2, two nonaqueous electrolyte batteries of Comparative Example 2-2 were produced in the same manner as in Example 1-1 except that the coating amount of the positive electrode slurry is decreased such that the capacity ratio p/n became 0.75.

The produced nonaqueous electrolyte batteries of Comparative Example 2-2 were conditioned to the initial state by the procedure similar to that in Example 1-1. Subsequently, the capacity ratio p/n of one nonaqueous electrolyte battery of Comparative Example 2-2 conditioned to the initial state was measured by the procedure similar to the above-described procedure. The ratio p/n of the nonaqueous electrolyte battery of Comparative Example 2-2 was 0.75.

[Evaluation]
<Measurement of OCV in SOC50%>

OCV in SOC50% ($OCV_{50}$) of the nonaqueous electrolyte of each of Example and each of Comparative examples conditioned to the initial state was measured by the procedure described above. Each result is shown in Table 1 below as a relative value when $OCV_{50}$ in Comparative Example 1-1 is defined as a reference (1.0).

<High-Temperature Cycle Test>

The nonaqueous electrolyte battery of each of Example and each of Comparative examples was subjected to 10000 charge-and-discharge cycles under an environment of 55° C. The battery was charged and discharged at the rate of 10 C in a voltage range of 1.5 V or more and 2.8 V or less.

<Capacity Measurement>

During the cycle test, the capacity of each nonaqueous electrolyte battery was measured before and after the cycle test is performed by the procedure described below.

First, each nonaqueous electrolyte battery is charged. As charge conditions, the current value is set to 0.2 C and the charging voltage is set to 2.8 V. This charge is performed under an environment of 25° C. until the current value becomes 0.05 C.

After the battery is charged, a pause is taken for 10 minutes. Subsequently, the nonaqueous electrolyte battery is discharged. As discharge conditions, the current value is set to 0.2 C and the final discharge voltage is set to 1.5 V. The discharge is performed under the condition of a constant current under an environment of 25° C. The discharged amount while the battery is discharged is measured as a discharge capacity at 0.2 C. The capacity retention ratio Cf/Cs was calculated by defining the capacity before the cycle as Cs and the capacity after the cycle as Cf. The capacity retension ratio of the nonaqueous electrolyte battery of each Example and each Comparative example is shown in Table 1 below as a relative value when Cf/Cs in Comparative Example 1-1 is set as a reference (=100).

<Resistance Measurement>

During the cycle test, the resistance of each nonaqueous electrolyte battery was measured after the cycle test by the procedure described below.

First, each nonaqueous electrolyte battery was charged up to the charging rate of 50% with respect to the nominal capacity. Then, these nonaqueous electrolyte batteries were discharged under an environment of 25° C. The discharge was performed for 10 seconds at the rate of 10 C. The resistance during the discharge was measured as described below. First, the voltage before the application of current was defined as $V_0$. On the other hand, the voltage 10 seconds after the start of current application was defined as $V_{10}$. Provided that the current value corresponding to the rate of 10 C is $I_{10C}$, the resistance $R_{10sec}$ during the discharge of 10 seconds can be calculated from the following formula (Formula 1).

$$R_{10sec} = |V_1 - V_0|/I_{10C} \quad (1)$$

$R_{10sec}$ of each nonaqueous electrolyte battery after 10000 cycles was measured. $R_{10sec}$ of the nonaqueous electrolyte battery in each Example and each Comparative Example is shown in Table 1 below as a relative value when $R_{10sec}$ in Comparative Example 1-1 after 10000 cycles is defined as a reference (=1.0).

range of 0.22 to 0.7 can achieve a high average-operating-voltage and high-temperature durability characteristics at the same time.

On the other hand, it is also evident that the nonaqueous electrolyte battery of Comparative Example 1-1 in which the substitution amount x of aluminum in aluminum-substituted lithium manganate is 0.18 was inferior particularly in high-temperature durability characteristics. The main reason for this can be considered that in the nonaqueous electrolyte battery of Comparative Example 1-1, a substitution amount of aluminum in aluminum-substituted lithium manganate was too small, and structure stabilization of lithium manganate could not be sufficiently achieved. It is also evident that the nonaqueous electrolyte battery of Comparative Example 1-2 in which the substitution amount x of aluminum in aluminum-substituted lithium manganate is 0.85 was inferior particularly in high-temperature durability characteristics. The main reason for this can be considered that in

TABLE 1

| | Positive Electrode Active Material $LiMn_{2-x}M_xO_4$ | | | Negative Electrode | Second Positive Electrode Active Material | | | | Relative Capacity | Relative Resistance |
|---|---|---|---|---|---|---|---|---|---|---|
| | Composition Formula | M | Substituted Amount x | Active Material | Composition | Added Amount (to LMO as 1) | Ratio p/n | Relative $OCV_{50}$ | Retention Ratio | (After Degradation) |
| Example 1-1 | $LiMn_{1.6}Al_{0.4}O_4$ | Al | 0.4 | LTO(S) | — | — | 0.98 | 1.03 | 103 | 0.63 |
| Example 1-2 | $LiMn_{1.3}Al_{0.7}O_4$ | Al | 0.7 | LTO(S) | — | — | 0.98 | 1.05 | 105 | 0.62 |
| Example 1-3 | $LiMn_{1.75}Al_{0.25}O_4$ | Al | 0.25 | LTO(S) | — | — | 0.98 | 1.01 | 102 | 0.95 |
| Example 2-1 | $LiMn_{1.73}Mg_{0.27}O_4$ | Mg | 0.27 | LTO(S) | — | — | 0.98 | 1.01 | 102 | 0.91 |
| Example 2-2 | $LiMn_{1.6}Cr_{0.4}O_4$ | Cr | 0.4 | LTO(S) | — | — | 0.98 | 1.03 | 103 | 0.63 |
| Example 2-3 | $LiMn_{1.6}Fe_{0.4}O_4$ | Fe | 0.4 | LTO(S) | — | — | 0.98 | 1.03 | 103 | 0.63 |
| Example 2-4 | $LiMn_{1.6}Co_{0.4}O_4$ | Co | 0.4 | LTO(S) | — | — | 0.98 | 1.03 | 103 | 0.63 |
| Example 2-5 | $LiMn_{1.6}Ga_{0.4}O_4$ | Ga | 0.4 | LTO(S) | — | — | 0.98 | 1.03 | 103 | 0.63 |
| Example 3-1 | $LiMn_{1.5}Al_{0.4}O_4$ | Al | 0.4 | LTO(S) | — | — | 0.9 | 1.03 | 103 | 0.67 |
| Example 3-2 | $LiMn_{1.5}Al_{0.4}O_4$ | Al | 0.4 | LTO(S) | — | — | 0.85 | 1.03 | 104 | 0.69 |
| Example 4-1 | $LiMn_{1.5}Al_{0.4}O_4$ | Al | 0.4 | LTO(R) | — | — | 0.98 | 1.01 | 103 | 0.63 |
| Example 4-2 | $LiMn_{1.6}Al_{0.4}O_4$ | Al | 0.4 | TiO2(B) | — | — | 0.98 | 1.01 | 103 | 0.63 |
| Example 4-3 | $LiMn_{1.6}Al_{0.4}O_4$ | Al | 0.4 | NTO | — | — | 0.98 | 1.02 | 103 | 0.63 |
| Example 5-1 | $LiMn_{1.6}Al_{0.4}O_4$ | Al | 0.4 | LTO(S) | $LiCoO_2$ | 0.04 | 0.98 | 1.01 | 111 | 0.69 |
| Example 5-2 | $LiMn_{1.6}Al_{0.4}O_4$ | Al | 0.4 | LTO(S) | $LiCoO_2$ | 0.02 | 0.98 | 1.02 | 107 | 0.66 |
| Example 5-3 | $LiMn_{1.6}Al_{0.4}O_4$ | Al | 0.4 | LTO(S) | $LiNi_{1/3}Co_{1/3}Mn_{1/3}O_2$ | 0.04 | 0.98 | 1.01 | 111 | 0.69 |
| Example 5-4 | $LiMn_{1.6}Al_{0.4}O_4$ | Al | 0.4 | LTO(S) | $LiFePO_4$ | 0.04 | 0.98 | 1.01 | 111 | 0.69 |
| Comparative Example 1-1 | $LiMn_{1.82}Al_{0.18}O_4$ | Al | 0.18 | LTO(S) | — | — | 1.2 | 1.00 | 100 | 1.00 |
| Comparative Example 1-2 | $LiMn_{1.15}Al_{0.85}O_4$ | Al | 0.85 | LTO(S) | — | — | 1.2 | 1.05 | 87 | 0.62 |
| Comparative Example 2-1 | $LiMn_{1.6}Al_{0.4}O_4$ | Al | 0.4 | LTO(S) | — | — | 1.2 | 0.98 | 108 | 0.53 |
| Comparative Example 2-2 | $LiMn_{1.6}Al_{0.4}O_4$ | Al | 0.4 | LTO(S) | — | — | 0.75 | 1.03 | 91 | 0.73 |

From results shown in Table 1, it is evident that when compared with the nonaqueous electrolyte battery of Comparative Example 1-1, nonaqueous electrolyte batteries in all examples have a higher average-operating-voltage, a higher capacity retention ratio after 10000 cycles, and a lower rate of resistance increase. From the above result, it is evident that nonaqueous electrolyte batteries in all examples can achieve a higher average-operating-voltage than that of the nonaqueous electrolyte battery of Comparative Example 1-1 and high-temperature durability characteristics superior to those of the nonaqueous electrolyte battery of Comparative Example 1-1 at the same time.

Particularly from results of Examples 1-1 to 1-3, it is evident that nonaqueous electrolyte batteries of Examples 1-1 to 1-3 in which the substitution amount x of aluminum in aluminum-substituted lithium manganate is within the the nonaqueous electrolyte battery in Comparative Example 1-2, a substitution amount of aluminum in aluminum-substituted lithium manganate was too large, and the spinel-type crystal structure was destabilized.

From results of Example 1-1 and Examples 2-1 to 2-5, it is evident that, even if the element M substituting for a portion of manganese of lithium manganate was changed from aluminum to other elements, the same effect of obtaining nonaqueous electrolyte batteries capable of achieving a high average-operating-voltage and excellent high-temperature durability characteristics at the same time could also be achieved.

From results of Example 1-1, Examples 3-1 and 3-2, it is evident that, even if the ratio p/n was varied within the range of 0.8 or more and 1 or less, the same effect of obtaining nonaqueous electrolyte batteries capable of achieving a high average-operating-voltage and excellent high-temperature durability characteristics at the same time can also be achieved.

On the other hand, it is evident that when compared with nonaqueous electrolyte batteries in Examples, the nonaqueous electrolyte battery of Comparative Example 2-1 whose ratio p/n is 1.2 had a lower average-operating-voltage. Also, it is evident that when compared with nonaqueous electrolyte batteries in Examples, the nonaqueous electrolyte battery of Comparative Example 2-2 whose ratio p/n is 0.75 had an extremely low relative capacity retention ratio.

From results of Examples 1-1 and 4-1 to 4-3, it is evident that the same effect of obtaining nonaqueous electrolyte batteries capable of achieving a high average-operating-voltage and excellent high-temperature durability characteristics at the same time can also be achieved provided that the negative electrode active material is an active material selected from the group consisting of titanium oxide and titanium-containing composite oxide even if the type of the negative electrode active material to be used is changed.

Then, from results of Examples 1-1 and 5-1 to 5-4, it is evident that high-temperature durability can further be enhanced by using a second positive electrode active material.

A nonaqueous electrolyte battery according to at least one of embodiments and Examples described above contains the positive electrode active material containing a manganese-containing composite oxide represented by the general formula of $Li_{1-a}Mn_{2-x}M_xO_4$ in the positive electrode and the negative electrode active material selected from the group consisting of titanium oxide and titanium-containing composite oxide in the negative electrode. In addition, the ratio p/n of the capacity p per unit area of the positive electrode to the capacity n per unit area of the negative electrode is within the range of 0.8 or more and 1 or less. Thank to that, the nonaqueous electrolyte battery can achieve an effect of increasing the average operating voltage and an effect of inhibiting input-and-output characteristics degradation caused by degradation of the positive electrode under a high-temperature environment at the same time. As a result, the nonaqueous electrolyte battery can exhibit a high average-operating-voltage and also exhibit excellent high-temperature durability.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A nonaqueous electrolyte battery comprising:
a positive electrode comprising a first positive electrode active material and a second positive electrode active material, the first positive electrode active material being a manganese-containing composite oxide having a spinel-type crystal structure and represented by a general formula of $Li_{1-a}Mn_{2-x}M_xO_4$ (where M is at least one element selected from Mg, Ti, Cr, Fe, Co, Zn, Al, and Ga, a is within a range of −1 or more and 1 or less, and x is within a range of 0.22 or more and 0.7 or less, the second positive electrode active material having a capacity per weight of 10 mAh/g or more and 150 mAh/a or less in a potential range of 3 V (vs. Li/Li$^+$) or more and 3.9 V (vs. Li/Li$^+$) or less with respect to an oxidation-reduction potential of a metal Li, where a ratio of a weight of the second positive electrode active material in the positive electrode to a weight of the first positive electrode active material in the positive electrode is 0.01 or more and 0.05 or less;
a negative electrode containing a negative electrode active material selected from the group consisting of titanium oxide and titanium-containing composite oxide; and
a nonaqueous electrolyte, wherein
a ratio p/n of a capacity p per unit area of the positive electrode to a capacity n per unit area of the negative electrode is within a range of 0.8 or more and 1 or less.

2. The nonaqueous electrolyte battery according to claim 1, wherein the element M in the general formula of the manganese-containing composite oxide is Al.

3. The nonaqueous electrolyte battery according to claim 1, wherein the second positive electrode active material is selected from the group consisting of lithium-cobalt composite oxide, lithium-nickel-cobalt composite oxide, lithium-nickel-cobalt-manganese composite oxide, lithium-manganese-cobalt composite oxide, and lithium iron phosphate.

4. The nonaqueous electrolyte battery according to claim 1, wherein the negative electrode active material is selected from the group consisting of lithium-titanium composite oxide having a spinel-type crystal structure, lithium-titanium composite oxide having a ramsdellite-type structure, monoclinic titanium dioxide, and monoclinic niobium-titanium composite oxide.

5. The nonaqueous electrolyte battery according to claim 1, further comprising a container member housing the negative electrode, the positive electrode and the nonaqueous electrolyte,
wherein the container member has a wall thickness within the range of 0.2 to 5 mm, and
the container member is a metallic container comprising at least one element selected from the group consisting of Fe, Ni, Cu, Sn, and Al.

6. The nonaqueous electrolyte battery according to claim 1, further comprising a container member housing the negative electrode, the positive electrode and the nonaqueous electrolyte,
wherein the container member has a wall thickness within the range of 0.1 to 2 mm, and
the container member is a container made of laminate film comprising a metal layer comprising at least one element selected from the group consisting of Fe, Ni, Cu, Sn, and Al, and resin layers sandwiching the metal layer therebetween.

7. A battery pack comprising the nonaqueous electrolyte battery according to claim 1.

8. The battery pack according to claim 7, wherein the battery pack comprises five of the nonaqueous electrolyte batteries connected to each other in series.

9. The battery pack according to claim 7, wherein the battery pack comprises a plurality of battery modules, each of which comprises five of the nonaqueous electrolyte batteries connected to each other in series, and
the plurality of battery modules is connected to each other in series, in parallel, or by combining a series connection and a parallel connection.

10. The nonaqueous electrolyte battery according to claim 1, wherein the ratio of the weight of the second positive electrode active material in the positive electrode to the weight of the first positive electrode active material is 0.02 or more and 0.04 or less.

11. The nonaqueous electrolyte battery according to claim 3, wherein the negative electrode active material is selected from the group consisting of lithium-titanium composite oxide having a spinel-type crystal structure, lithium-titanium composite oxide having a ramsdellite-type structure, monoclinic titanium dioxide, and monoclinic niobium-titanium composite oxide.

12. The nonaqueous electrolyte battery according to claim 1, wherein a is 0.

13. The nonaqueous electrolyte battery according to claim 1, wherein x is within a range of 0.3 or more and 0.55 or less.

14. The nonaqueous electrolyte battery according to claim 1, wherein M is Al.

15. The nonaqueous electrolyte battery according to claim 1, wherein a is 0, x is within a range of 0.3 or more and 0.55 or less, and M is Al.

16. The nonaqueous electrolyte battery according to claim 11, wherein a is 0, x is within a range of 0.3 or more and 0.55 or less, and M is Al.

* * * * *